(12) United States Patent
Völkening et al.

(10) Patent No.: US 8,266,447 B2
(45) Date of Patent: Sep. 11, 2012

(54) METHOD AND APPARATUS FOR THE SECURE PROCESSING OF SENSITIVE INFORMATION

(75) Inventors: Stephan Völkening, Köln (DE); Hardy Jüngermann, Berlin (DE); Torsten Hupe, Oberhaching (DE)

(73) Assignee: Bayer Innovation GmbH, Dusseldorf (DE)

( * ) Notice: Subject to any disclaimer, the term of this patent is extended or adjusted under 35 U.S.C. 154(b) by 902 days.

(21) Appl. No.: 12/282,237

(22) PCT Filed: Feb. 27, 2007

(86) PCT No.: PCT/EP2007/001677
§ 371 (c)(1),
(2), (4) Date: Jan. 24, 2009

(87) PCT Pub. No.: WO2007/104423
PCT Pub. Date: Sep. 20, 2007

(65) Prior Publication Data
US 2009/0254758 A1    Oct. 8, 2009

(30) Foreign Application Priority Data
Mar. 11, 2006 (DE) .......... 10 2006 011 402

(51) Int. Cl.
*G06F 11/30* (2006.01)
*G06F 12/14* (2006.01)

(52) U.S. Cl. ........ 713/189; 713/168; 713/173; 713/175; 713/176; 713/180

(58) Field of Classification Search .......... 713/168, 713/173, 175, 176, 180, 189
See application file for complete search history.

(56) References Cited

U.S. PATENT DOCUMENTS

| | | | | |
|---|---|---|---|---|
| 5,694,471 A | * | 12/1997 | Chen et al. | 705/76 |
| 7,904,952 B2 | * | 3/2011 | Yeap et al. | 726/12 |
| 2003/0159044 A1 | | 8/2003 | Doyle et al. | |
| 2004/0019564 A1 | * | 1/2004 | Goldthwaite et al. | 705/44 |
| 2004/0128256 A1 | * | 7/2004 | Krouse et al. | 705/65 |
| 2004/0247118 A1 | | 12/2004 | Tateno et al. | |
| 2004/0255081 A1 | * | 12/2004 | Arnouse | 711/115 |
| 2005/0050366 A1 | * | 3/2005 | Kwok et al. | 713/202 |
| 2005/0160277 A1 | * | 7/2005 | Sciupac | 713/185 |
| 2005/0269410 A1 | | 12/2005 | Wilson | |

FOREIGN PATENT DOCUMENTS

| | | |
|---|---|---|
| DE | 10037176 | 2/2002 |
| EP | 0 216 298 A2 | 4/1987 |
| EP | 0769 758 A2 | 4/1997 |
| EP | 1 161 055 | 5/2001 |
| EP | 1 492 095 | 12/2004 |

OTHER PUBLICATIONS

International Search Report dated Aug. 24, 2007 (6 pages).

* cited by examiner

*Primary Examiner* — Jeffrey Pwu
*Assistant Examiner* — Jayesh Jhaveri
(74) *Attorney, Agent, or Firm* — Baker, Donelson, Bearman, Caldwell & Berkowitz, PC

(57) ABSTRACT

The subject matter of the invention relates to a system (1) and to a method for securely processing information, particularly sensitive information by means of a signature and/or encryption principle, comprising at least the following: a mobile passive first storage unit (1) for retrievably storing first information, a processing device (3) which is adapted for interacting with the first storage unit (2) in order to process information, comprising: a decryption-protected second storage unit (6) for retrievably storing second information corresponding to the first information, a computer unit (5) for (cryptographically) processing information, an information transmission unit (4), for transmitting the information of the first and/or the second storage unit (2, 6) to the computer unit (5).

17 Claims, 1 Drawing Sheet

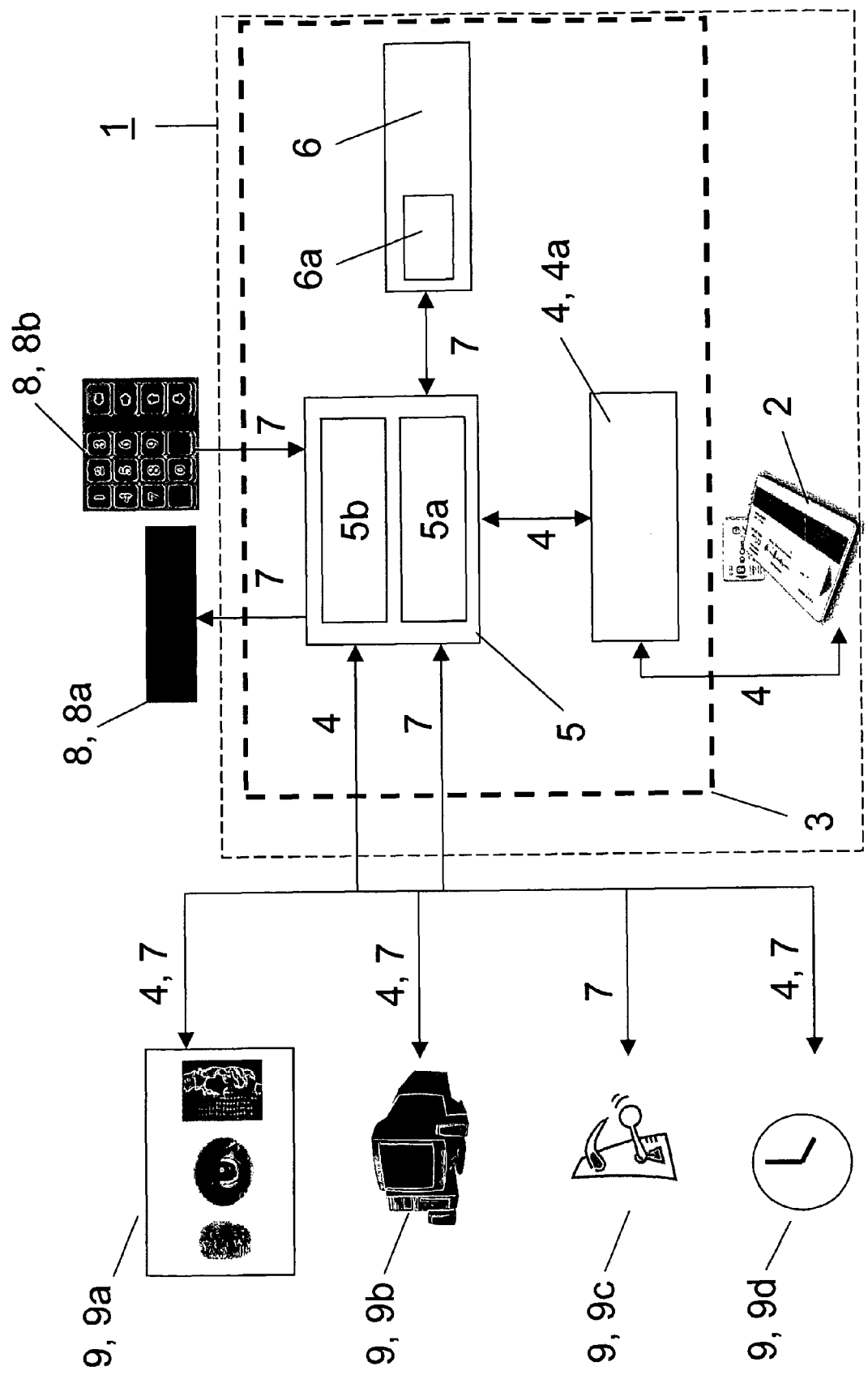

METHOD AND APPARATUS FOR THE SECURE PROCESSING OF SENSITIVE INFORMATION

CROSS REFERENCE TO RELATED APPLICATIONS

This application is a §371 National Stage Application of PCT/EP2007/001677 filed Feb. 27, 2007 which claims priority to German Application 10 2006 011 402.7 filed Mar. 11 2006.

BACKGROUND OF THE INVENTION

1. Field of the Invention

The present invention relates to a system and a method for safely processing information, particularly sensitive information, to the use of the system and of the method in accordance with the corresponding precharacterizing clauses of claims 1, 12, 13, 14.

2. Description of Related Art

Systems, methods and/or uses for safely processing information, particularly sensitive information are generally known.

For example, access control devices such as automatic cash dispensers are known which only provide access via authentication, for example, by means of magnetic strip cards or chip or smart cards, sometimes also in combination with a PIN. Sensitive information is stored on the cards, which requires an interrogation of other information (e.g. PIN) as protection against unauthorized use. In the case of magnetic strip cards or chip cards for electronic cash transactions, encrypted data are stored. In the case of passive cards such as the magnetic strip card, these data are decrypted externally, that is to say in a separate reader. In the active cards, a computing unit such as a chip is integrated in the card. In this arrangement, information can be decrypted on the chip. To prevent misuse of a chip card, the access to the chip is controlled, e.g. by a pin or by interrogating a biometric feature.

Magnetic cards and chip cards have the disadvantage of being easily susceptible to damage, contamination or other impairments, for example due to mechanical or electromagnetic influences. In addition, magnetic cards and chip cards have a limited storage volume which is very small due to predetermined dimensions of the cards. In comparison with magnetic strip cards, chip cards have a higher storage capacity and are also safer against manipulation and copying.

For this reason, some authentication methods are today restricted to the chip card. Thus, e.g. signature cards by means of which a person can prove the authenticity and integrity of sensitive information electronically are only produced as chip cards.

SUMMARY OF THE INVENTION

However, chip cards are very expensive to produce and are therefore many times more expensive than e.g. magnetic strip cards.

It is the object of the invention to create a system and/or method for safely transmitting sensitive information which can be used in a wide field of application and for different uses, and in particular, can be easily operated by the general public.

It is a further object to create a reliable system and/or method for safely transmitting sensitive information which can rapidly transmit a large amount of data reliably and with little susceptibility to interference and can prevent unauthorized use or utilization.

This object is achieved by a system according to the precharacterizing clause of claim 1, a method according to the precharacterizing clauses of claims 12 and/or 13.

The present invention includes the technical teachings that a system for reliably processing information particularly sensitive information by means of a signature and/or encryption principle comprises at least the following: a first mobile, passive storage unit for retrievable storage of first information, a processing device which is designed for interacting with the first storage unit in order to process information, comprising: a decryption-protected second storage unit for retrievably storing second information corresponding to the first information, a computer unit for processing, preferably for cryptographically processing the information, an information transmission unit for transmitting the information of the first and/or second storage unit to the computer unit.

BRIEF DESCRIPTION OF THE DRAWINGS

FIG. 1 diagrammatically shows a system for processing information according to the present invention.

DETAILED DESCRIPTION OF A PREFERRED EMBODIMENT

In the text which follows, processing is generally understood to mean the processing according to the IPO(S) principle—input, processing, output (storage). More generally, it can also be called handling information.

Information is understood to be, in particular, all information but especially the information which must be protected against unauthorized access, this is to say generally sensitive and/or confidential information such as, for example, personal data comprising diagnosed disease patterns, therapies, financial data such as bank connection data and the like.

To protect the information against unauthorized access by the third parties and/or to check the integrity and/or authenticity of the information, a signature and/or encryption principle is provided for the processing.

The system or device for processing the information comprises at least a first mobile storage unit for retrievably storing first information. The first storage unit is correspondingly object- or person-related and is administered by the object or person and stored there. The first storage unit is adapted to be mobile so that it can be moved along with the object or the person. In the mobile first storage unit, data or information is stored which can be read out by a corresponding device if necessary. The information comprises, for example, an electronic key, for example a private key of a pair of keys and/or a signature or electronic signature. Furthermore, the information can contain data which must be protected against the access of other persons or stored inaccessibly. This can be, for example bank account data, clinical data, identity data and the like. This information is preferably encrypted and/or signed with a corresponding key.

To be able to process this information if necessary, a processing device is provided in the system. The processing device interacts with the first storage unit in such a manner that the confidential information can be read out by means of the processing device or can be stored on the first storage unit.

The processing device comprises at least one second storage unit. The second storage unit is preferably adapted to be safe against decryption. This can be implemented by physical protection such as, for example, closed housings which are inaccessible without authorization and/or by other protective devices such as, for example, data protection.

In the second storage unit, second information is stored. The second information, particularly the second sensitive and/or confidential information corresponds to the first information of the first storage unit. For example, the second information can comprise a counter key corresponding to the key of the first storage unit, for example for forming a pair of keys. Furthermore, relevant data for authentication corresponding to the data of the first storage unit can be stored in the second storage unit.

To process at least parts of the first information which is encrypted and/or signed, this must first be decrypted and/or the signature must be checked. For this reason the processing device comprises a computer unit for processing, particularly cryptographically processing the information. This computer unit processes the at least partially encrypted and/or signed data so that a transaction can be performed which must only be carried out by the carrier of the first storage unit.

In order to transmit the information from the first and/or second storage unit to the computer unit, an information transmission unit is also provided. This can be used for safely transmitting the corresponding information.

It is also preferred that at least one of the storage units is constructed as a non-electronic storage unit on which and/or from which the confidential information, particularly the first information, can be non-electronically stored and/or retrieved. Non-electronic storage units comprise, for example, magnetic or optical storage units.

It is particularly preferred that at least one of the storage units is constructed as optical storage unit comprising the group of photoaddressable polymers as storage medium on which and/or from which the confidential information, particularly the first information can be optically stored and/or retrieved.

The photoaddressable polymers form a class of materials which is distinguished by the fact that a directional birefringence can be written into the material by means of light (*Polymers as Electrooptical and Photooptical Active Media*, V. P. Shibaev (Editor), Springer Verlag, N.Y., 1995, *Natansohn et al., Chem. Mater.* 1993, 403-411). Examples of these photoaddressable polymers are polymers with azobenzene-functionalized side chains which are described, e.g. in U.S. Pat. No. 5,173,381.

By means of the optical storage of information, this can be arranged reliably, largely protected against external influences, and in high quantity in a very small space. In particular, the optically stored information is deposited safe from influences such as magnetic fields or electrical influences. The optical storage results in an optimum ratio of capacity to storage size. In addition, the optical storage units are more advantageously produced than, e.g. electronic storage units such as chips. For this reason, the optical storage also results in an optimum ratio of capacity to cost.

It is also preferred that at least one of the storage units is constructed in the form of a card selected from the group of chip cards, storage cards, smart cards. The design as a card provides for an easily handled and mobile construction of the memory. The card preferably has the same dimensions as other cards in daily use, for example credit cards and the like. This form of card enables the mobile memory to be easily kept, for example, in money purses and the like without having to create special storage units for this purpose. The card preferably has the format ID-1, therefore, which is also defined in the ISO/IEC 7810 standard. This format can be preferably used also with conventional readers and the like.

To store as much information and/or data as possible on the card and/or in a mobile storage unit, it is also preferred that at least one of the storage units has a storage capacity of preferably more than 0.5 Mbytes, more preferably more than 1.0 Mbytes and most preferably more than 1.5 Mbytes. Conventional memories such as magnetic strips, chips and the like have smaller memories which can only store a very limited number of information items. Thus, only few information items can be stored. More information cannot be deposited. Using the preferred storage capacity according to the invention, larger amounts of data, possibly also more elaborately encrypted, can now be stored.

To ensure the high storage capacity, the storage medium which is used for forming the storage unit, particularly the first mobile storage unit, is adapted as polymer, in particular as polymer from the group of photoaddressable polymers.

In particular information can be stored holographically in the mobile memory, particularly preferably as one or more polarization holograms. The holographic storage of information provides an effective and improved protection of the information against unauthorized handling by further persons such as, for example copying or other manipulation.

Holographic storage is an analogue storage method, i.e. information is present in analogue form in the first mobile memory.

The sensitive information which is stored in the first mobile memory is preferably present in digital form before it is stored in the mobile memory and/or after it is read out of the mobile memory.

Before storage in the mobile memory and/or after being read out of the mobile memory it is preferably present encrypted and/or is signed.

A preferred embodiment provides that at least one of the storage units, preferably the second storage unit is constructed as a digital storage unit in which and/or from which the information can be digitally stored and/or retrieved. The information is preferably stored digitally in the corresponding storage unit, in particular the second storage unit, not lastly for reasons of storage space. The digital confidential information is preferably digitally encrypted and/or signed. In the case in which the sensitive information is signed, the signature is preferably stored together with the sensitive information in the storage unit. For this reason, it is also preferred that at least one of the storage units, preferably the second storage unit, is constructed as encryptable storage unit on which and/or from which the first confidential information can be stored and/or retrieved encrypted.

To store a large amount of information the corresponding storage unit is preferably constructed as a passive memory. The mobile storage unit, in particular, stores a large amount of information. For this reason, the passive storage unit does not have any areas in which calculation, processing, decryption, etc. of the information by means of corresponding algorithms is actively performed.

In contrast, much less information is mostly stored in the second storage unit so that an algorithm for processing the information can be stored here. For this reason, it is preferred that the second storage unit is an active storage unit. In the systems hitherto known, the mobile storage unit is constructed as active memory (chip card) or the mobile storage unit has a very small and safe memory (holographic memory card).

Constructing the first mobile memory as a passive, safe memory with high storage capacity and constructing the second memory as active memory or active storage unit thus creates a safe, rugged and cost-effective system. In particular, it is preferred, therefore, that the second storage unit is an electronic storage unit in which and/or from which the second information can be electronically stored and/or retrieved. In contrast to a construction as magnetic or non-electronic storage unit, the, in particular, sensitive information and the algorithms preferably can be stored electronically in the electronic storage unit and corresponding communication with computer units can be implemented without problems, without, for example, interposing analogue/digital converters.

In a preferred embodiment, the first memory is thus constructed as optical memory, that is to say as passive memory and the second memory is constructed as electronic memory. A card with a corresponding second memory is also called an active storage card, since the second memory is coupled in connection to a computing unit.

In the first memory, the information is therefore stored optically, preferably holographically. In order to transmit the data by means of an information transmission unit to the second electronic storage unit, the data must then be changed from the analogue state into the electronic or digital state. For this purpose, a light source is used in combination with a camera as information transmission unit. The hologram on the first storage unit is then illuminated with the light source. Due to the diffraction of the light beam at the hologram, an image of the stored information is generated. This generated image which contains the sensitive information is picked up by the camera and, in consequence, imaged there. From the optical signals, the camera then generates electronic or digital signals which correspond to the second storage unit.

To process the sensitive information, the second memory is connected to a first computer unit. This first computer unit alone has access to the information in the second memory. There are no possibilities for unauthorized persons to read and/or manipulate the information deposited in the second memory from the outside. It is only the first computer unit that can communicate with the second storage unit in such a manner that data are transmitted between the two.

The first computer unit has cryptographic functions by means of which information can be encrypted and decrypted or also signed. In particular, the functions also comprise a possibility of creating and/or checking a signature. Just as the second storage unit is protected against access by unauthorized persons, the first computer unit is also protected against access by unauthorized persons.

It is preferred that the computer unit, the second storage unit and an information transmission unit are adapted for exchanging data between computer unit and second memory in one unit or facility. Using this unit, the information can then be exchanged between the first and second memory.

It is preferred that the computer unit is constructed integrated in the second storage unit in the manner of a smart card or chip card. To prevent unauthorized manipulation, the unit of computer unit and storage unit is preferably provided with a certificate, for example in accordance with the "common criteria", achieving, in particular an EAL 4+ or higher. This provides very high security.

As already described, it is preferred that the information transmission unit between the mobile first memory and the second memory is constructed as an optical information transmission unit in order to transmit information via at least one beam path.

It is preferred that the computer unit has at least one transmission channel via which information can be transmitted to and/or from other computer units.

Such a transmission channel is preferably adapted as protected channel. A protected channel can be an encrypted channel (logical protection); but can also be a channel in which unauthorized persons cannot attack from the outside since it is located, e.g. in a monitored environment or is not accessible (physical protection).

To exchange data between different computer units, the computer units must mutually authenticate themselves before the data exchange.

An information transmission unit preferably can be constructed as a writing and/or reading unit.

A preferred embodiment provides that the optical information transmission unit is constructed for emitting polarized light comprising the group of lasers in order to transmit information optically by means of at least one beam.

Just as it is possible to provide other computer units, for example for increasing security, it is also preferred that furthermore a third storage unit is provided for storing third information corresponding to the first and/or second information. This also makes it possible to implement a further security interrogation, for example, in the form of an iris scan, input of a PIN, acquisition of other biometric data such as a fingerprint, and the like.

For the administration of, for example, a number of keys and/or certificates and the like, for example for different users, it is preferred that furthermore a key management unit is provided for administering a number of keys and/or signatures.

The invention also includes the technical teaching that a method for the secure cryptographic processing, handling and/or transmission of information is provided comprising the following steps: reading and/or storing first encrypted information on a first passive mobile memory, reading and/or storing second information corresponding to the first information, transmitting the first encrypted information in a computer unit, transmitting the second information in a computer unit, cryptographically processing the first information by means of the second information in the computer unit, wherein the step of reading and/or storing first information and/or the step of transmitting the first information is performed at least partially in non-electronic manner.

In particular, the method according to the invention for processing confidential information comprises the steps described in the text following.

Information, particularly sensitive information which has previously been stored in a mobile memory is transmitted from the first mobile memory to the first computer unit with the aid of an information transmission unit. If the information is digitally encrypted, it is decrypted with the aid of the first computer unit and the information, for example cryptographic keys, stored in the second memory. If the information is signed, the signature is correspondingly checked.

In particular, the information in the first mobile memory is encrypted by a symmetric encryption system. For this purpose, e.g. an encryption method of the type of AES or the like can be used. For the signature, a standard procedure for electronic encryption is preferably used. For this purpose, e.g. a method of the type of RSA or ECDSA (elliptic curve digital signature algorithm) can be used.

It is preferred that the step "reading and/or storing first information" and/or the step "transmitting the first information" is performed optically. In this manner, a transmission can be implemented which is optimized with regard to transmission speed and data security.

It is also preferred that at least one of the steps of the method according to the invention is carried out digitally. Digital processing brings the advantage of easy processibility by means of computers without requiring an A/D converter. This makes it possible to implement a simpler configuration and a simpler method.

To make the information accessible only through authorized positions, it is preferred that at least one of the steps "reading and/or storing" and/or "transmitting" is carried out encrypted. This ensures a high degree of data security. In the case of optical, digital processing, in particular, encryption achieves a maximum degree of data security so that very confidential information can also be processed by means of this method. Overall, it is possible to achieve a very high degree of security in data security by means of this method.

The first information is preferably available in optically transmittable form. In addition, it is also preferred that the step "reading and/or storing" and/or "transmitting second information" is carried out electronically. The second information which is protected against unauthorized access, in any case, and as a rule, is not stored in a mobile storage unit, can thus be easily processed by means of computer units. For this purpose, in particular, memories and/or processing media already known from the prior art can be used which are in each case adapted to the corresponding application according to the present invention.

It is of special advantage that the steps "reading and/or storing" of second information and cryptographic processing are carried out in one component. In this manner, the devices necessary for encryption and decryption can be accommodated in space-saving manner in one component. This component is correspondingly protected against access from the outside or by third parties. Due to the fact that these steps are carried out in one component, no time-consuming transmission media need to be provided for transmitting the data either. Due to the integration in one component, it is only this one component which needs to be protected against unwanted access.

To produce effective protection or authentication of information, it is either provided with a signature and/or encrypted. For this reason, it is advantageous if the step "reading and/or storing" also comprises a step "reading and/or storing signature and/or key data". The signature and/or the key data can be deposited in the various storage units thus, for example, also in the mobile storage unit. If the data are stored holographically, a high standard of security can be implemented which renders the reading out of the signature and of the key at least almost impossible.

It is particularly when the confidential information is read and/or stored as hologram comprising polarization holograms, that these are optimally protected against unwanted or undesirable access since, in particular, holograms cannot readily or cannot be read out in a simple manner by third parties.

In addition, the storage as hologram also provides an effective protection against manipulation and/or copying.

To administer the information of as many users as possible, all of which can preferably be provided with signatures or can be encrypted with corresponding individual keys, it is preferred that the, in particular, sensitive information is administered by means of a key management. The key management is a component of the present invention.

In the key management, keys and certificates are defined, selected, and/or derived and allocated to the various components of the system in such a manner that secure processing of, in particular, sensitive information is ensured. Furthermore, the key management ensures that components can be removed from the system and/or integrated in the system without requiring a complete exchange of keys and/or certificates.

For the key selection and key allocation, a group of components is initially defined all of which belong to a system. For each system, there is a plurality of mobile memories and at least one or more reading/writing devices for these mobile memories. The reading/writing devices in each contain at least one memory in the form of the second memory already described, in conjunction with a computing unit.

Such a system could be, e.g. a company which issues an employee card to all employees for the access control application. In this case, the employee cards and the reading/writing devices are components which belong to a system.

The system can also be, e.g. a bank which issues a bank card to its customers (mobile memory). In this case, the bank cards and the reading/writing devices are components which belong to a system.

For a system there is a global key K. This key is securely stored in the second memory (of each reading/writing device of a system). For each mobile memory ($ID_i$) which belongs to the system, a unique key $K_i=f(K, ID_i)$ is derived, f being the key derivation function. Confidential information is encrypted with the key $K_i$ on the first mobile memory. During the decryption, the information encrypted with $K_i$ and stored in the mobile memory are transmitted to the first computing unit with the aid of the information transmission unit and decrypted with the aid of the key K deposited in the second memory.

The system also has a global certificate $<TC>$, which, for example, has been issued by a trust centre (TC). The $<TC>$ certificate includes a secret key t. The global certificate is also stored in the second memory (of each reading/writing device of a system). There is a certificate $<ID_i>_t$ for each mobile memory $ID_i$. To prove the authenticity and/or integrity of information m, it is signed as $S:=Sig(m, k_i)$ in the mobile memory with the aid of the corresponding secret key $k_i$. The signature S, together with the certificate, is stored in the mobile memory. During the signature check, the data m, the signature S and the certificate $<ID_i>_t$ are transmitted with the aid of the information transmission unit from the mobile memory to the first computing unit. With the aid of the first computing unit and the global certificate $<TC>$ stored in the second memory, the certificate $<ID_i>_t$ is first verified. Then, the signature S is verified by means of the certificate $<ID_i>_t$. When all verifications are successful, the signature is accepted.

In a further embodiment of the invention, the higher-level unit (TC) signs the data m directly with the aid of the secret key t. This can be of interest e.g. for biometric access control. In this arrangement, the higher-level unit first checks whether the information to be deposited in the mobile memory actually belongs to it. In the case of biometric access control, the higher level organization checks whether the biometric data (information m) to be deposited in the identify card (mobile memory) actually belongs to the owner of the card, and signs the correctness.

The system for the signature, described above is then changed in such a manner that the information m is signed as $S:=Sig(m, t)$. The signature S, together with the data m is stored in the mobile memory. It can be verified by applying $<TC>$.

It is possible both first to sign information and then encrypt the data and the signature, and first to encrypt the data and then to sign the encrypted data.

As already stated above, it is conceivable that the first computer unit is connected to other computer units via transmission channels. It is then of particular interest that these further computer units be tied into the secure transmission of sensitive information. In this case, other computer units belong to the system which are to be called devices on a higher level.

With a system, there is a group certificate <G> with the corresponding secret key g. The group certificate <G> is stored in each device belonging to the system. Each device having the identity number $ID_i$ has a certificate $<ID_i, A_i>_g$, which has been signed with the secret key g. It contains attributes $A_i$ which can provide information about the type of device (e.g. biometric acquisition system, database, etc.). Two devices in communication with one another via an encrypted channel exchange their certificates. They verify the signature of the certificate $<ID_i, A_i>_g$ by applying <G> and verify the attributes. It is then only when the signatures have been checked without error that a secure transmission path is set up between the devices.

It is preferred to provide the certificate $<ID_i, A_i>_g$ with a limited validity period. The certificate can be introduced into the devices, e.g. in the form of a smart card, so that a simple possibility for an exchange is provided.

After the validity of the certificate has expired, the keys are renewed. In the case of the smart card solution, this can be done simply by exchanging the smart cards in the devices.

To exclude devices from the secure information exchange, they are blocked. Each device contains a list (CRL) of revoked certificates. These certificates can be group certificates or device certificates. In the case of a group certificate, entire groups of devices are blocked, in the case of device certificates, individual devices are blocked. Such a blocking list with revoked devices must be loaded into each device. The blocking list is signed with a global certificate, e.g. with the certificate <TC> introduced above. The blocking list is then loaded into the devices together with the signature Sig(CRL, t). As a result, devices which e.g. have been stolen by an attacker, can be blocked so that the attacker does not have any possibility of accessing confidential information with the aid of the stolen devices.

The blocking list can also be updated or interrogated by interrogating a central server. On the server, a check is made whether there is an entry for the certificate currently to be checked.

The use of a system according to the invention and/or of a method according to the invention is particularly preferred as and/or in
- access control systems,
- entrance control system,
- automatic cash dispenser systems,
- identification system,
- system for administering medical data (e.g. health card).

Further preferred features are described in greater detail in the dependent subclaims or by means of the following figure, in which:

FIG. 1 diagrammatically shows a system according to the invention for processing information by means of a signature and/or encryption principle.

FIG. 1 diagrammatically shows a system 1 according to the invention, for processing information, particularly sensitive information according to the present invention. The system 1 comprises a storage unit 2 which is presently constructed as a mobile storage unit and, in particular, is constructed as a mobile passive storage unit. The storage unit can be constructed in any arbitrary form but is presently constructed as a memory card which is also symbolically shown in the corresponding box. In the present case, the storage unit 2 is constructed for optically storing information or data. The information to be stored is confidential or sensitive information which, in particular comprises biometric data and/or signature data including error correction data. The data are deposited holographically and/or digitally encrypted in the storage unit 2.

In addition to the storage unit 2, the system 1 also comprises a processing device 3 which is shown diagrammatically by a dashed line. The processing device 3 is constructed in such a manner that it can interact with the storage unit 2, particularly read from and/or write to the storage unit 2. The arrow from the storage unit 2 into the processing device 3 and conversely diagrammatically represents the reading and writing, respectively of the data from the storage unit 2.

For the transmission of information from the storage unit 2, the processing device 3 comprises a first information transmission unit 4 which presently comprises a sensor unit (camera) 4a which is suitable for signal processing. The information transmission unit generally comprises all transmission means between different units, components and the like. As is diagrammatically indicated by the corresponding arrows to the first information transmission unit 4a and away from it respectively, the first information transmission unit 4 and the sensor unit 4a, respectively are used for transmitting information.

Furthermore, the system 1 comprises a computer unit 5 for cryptographically processing information. For this purpose, the data or information is transmitted from the sensor unit 4a or more generally from the first information transmission unit 4 to the computer unit 5 and away from it, respectively.

The system 1 also comprises a second storage unit 6. The second storage unit 6 is constructed to be protected against decryption and is used for the retrievable storage of second information corresponding to the first information. In particular, these are further security-related data which, together with the first information, provide access or entry. Among other things, the second storage unit comprises an area 6a in which the corresponding keys for decrypting sensitive information are stored. Other data which can be retrieved in the area can be data for decryption, signature, MAC (message authentication code) or also in the other direction, for example, for encrypting or authentication.

The corresponding data which correspond to the data read in from the first storage unit 2 are transmitted via a secure second information transmission unit 7 from the second storage unit 6 or 6a, into the computer unit 5. The information transmission unit 7 is constructed in such a manner that it has effective protective mechanisms against attackers so that monitoring of the communication and/or manipulation of the exchanged information is not possible.

In FIG. 1, the computer unit 5 is constructed, for example, as consisting of two modules 5a and 5b. Module 5a handles the cryptographic calculations whereas module 5b controls the entire sequence and is responsible for the communication with other connected components (8, 9).

To ensure further protection by means of a personal input of the intended carrier of the mobile storage unit 2, the system 1 provides for external communication with the intended carrier of the mobile storage unit 2. For this purpose, the system has interfaces 8 for the external communication in the processing device.

A first interface 8a is used for inputting and displaying input requests or inquiries which are used for verifying the carrier. This first interface 8a is here constructed as a display. The display displays, for example, the input request to input a personal identification number (PIN).

A second interface 8b is used for the input of information by the user of the processing device 3. This second interface 8b is presently implemented as a numerical input with the possibility of controlling the input by cursor movement. The user of the processing device 3 can input control parameters or personal data, for example, a PIN, via this input or input unit.

The first interface 8a is unidirectionally connected to the computer unit 5, more precisely to the second module 5b via a secure second information transmission unit 7, the direction being directed from the second module to the first interface 8a.

The second interface 8b is unidirectionally connected to the computer unit 5, more precisely to the second module 5b, via a secure information transmission unit 7, the direction being directed from the second interface 8b to the second module 5b.

The system 1 shown in FIG. 1 comprises, apart from the mobile storage unit 2 and the processing unit 3 which form the core of the system, other peripherals 9 or connection systems by means of which data or information can be exchanged via corresponding connections. Thus, this peripheral 9 can have a first connection system 9a for biometric acquisition and for matching information. For this purpose, the second module 5b is bidirectionally connected to the first connection system 9a in order to transmit control signals. On the other hand, the second module 5b is bidirectionally connected to the first connection system 9a via a secure connection in order to transmit biometric data and to transmit the result of a verification back. A secure connection is a connection which is not accessible to an attacker from the outside. The first connection system 9a can be, for example, an iris scan device or any other device for detecting biometric data such as fingerprint, iris pattern, voice and the like.

Furthermore, the peripheral 9 can comprise a second connection system 9b. This second connection system 9b can be a database which, for example comprises a computer network or simply a server. In the database, corresponding information can be stored which can be retrieved by the user after verification. The second connection system 9b is connected to the processing device 3, more precisely to the second module 5, via a secure or simple connection and data or information M is transmitted between these. In the case of an exchange of sensitive information, the connection is constructed as secure second information transmission unit 7. In the case of an exchange of uncritical information, a simple, first information transmission unit 4 can be selected.

In addition, the peripheral 9 can comprise a third connection system 9c. The third connection system 9c can be constructed as an access, for example a door lock, which grants access after a verification or authentication of the information or of the user. The third connection system 9c is connected to the computer unit 5 via a bidirectional connection. To prevent an attacker from sending signals to a connection system 9c constructed as access from the outside in order to open the access, the connection system 9c is preferably connected to the computer unit 5 via a secure connection 7.

Furthermore, the peripheral 9 can comprise a fourth connection system 9d. The fourth connection system 9d can be, for example a time processing device, for example which grants time acquisition or access limited in time. The fourth connection system 9d is connected bidirectionally to the computer unit 5 via a secure connection and, among other things, time information is transmitted.

In the case of an exchange of sensitive information, the connection is constructed as secure connection or second information transmission unit 7, respectively. In the case of an exchange of uncritical information, a simple connection or first information transmission unit 4 can be selected.

The peripheral 9 can generally comprise in each case only one of the connection systems 9a to 9d or also any combination of connection systems.

LIST OF REFERENCE DESIGNATIONS

1 System
2 First storage unit
3 Processing device
4 First information transmission unit
4a Camera
5 Computer unit
5a First module
5b Second module
6 Second storage unit
7 (Secure) second information transmission unit
8 Interface(s)
8a First interface
8b Second interface
9 Peripherals
9a First connection system
9b Second connection system
9c Third connection system
9d Fourth connection system

The invention claimed is:

1. A system for securely processing information by means of a signature and/or encryption principle, comprising:
 a mobile, passive first storage unit for retrievably storing first information, with an unambiguous identification number $IDS_i$ wherein the index i specifies the number of first storage units belonging to the system;
 a processing device which is adapted for interacting with the first storage unit in order to process information, comprising:
  i) an unambiguous identification number $IDV_n$, wherein the index n specifies the number of processing devices belonging to the system;
  ii) a manipulation-protected second storage unit, which cannot be accessed from the outside, for securely storing second information corresponding to the first information;
  iii) a computing unit for processing information, wherein the computing unit is constructed to be integrated in the second storage unit in a manner of a smart card or chip card; and
  iv) an information transmission unit for transmitting information from the first and/or the second storage unit to the computing unit and for transmitting information between the processing device and connected peripheral;
 wherein at least one of the storage units is constructed as an optical storage unit and at least one of the information transmission units is constructed as an optical information transmission unit in order to transmit information via at least one beam path, and
 wherein for a group of at least two processing devices and/or components of the connected peripheral, there is a group certificate <G> with the corresponding secret key g which is stored in the processing device or a component belonging to the group, and for each of the processing devices and/or components of the connected peripheral, belonging to the group, there is a certificate $<IDV_n, A_n>_g$ which is signed with the secret key g and is stored in each processing device and/or component belonging to the group, wherein $A_n$ represents attributes which can provide information about characteristics of the processing device and/or component, and
  in each of the processing devices and/or component of the connected peripheral belonging to the group, a list of revoked certificates is stored, the list being signed with a global certificate <TC> and this signature also being stored in each processing device and/or component belonging to the group, and
 wherein the processing device and the peripheral are configured such that before exchanging sensitive information, the processing device and peripheral will first: exchange their certificates $<IDV_n, A_n>_g$, and verify said certificates by application of the group certificate <G>, and check the validity of other certificates in each case by means of said list of revoked certificates.

2. A system according to claim 1, wherein a cryptographic key K is stored in the manipulation-protected second storage unit which cannot be accessed from the outside,
and information m is stored encrypted in one of the first storage units with the aid of a key $K_i$, wherein the key can be uniquely derived from the key K in the second storage unit by means of a key derivation function f: $K_i=f(K, IDS_i)$.

3. A system according to claim 1, wherein a global certificate <TC>, to which a secret key t belongs, is stored in the manipulation-protected second storage unit which cannot be accessed from the outside, and
in at least one first storage unit $IDS_i$ belonging to the system, a certificate $<IDS_i>_t$ derived from the global certificate <TC> is stored to which a secret key $k_i$ belongs, and in at least one first storage unit IDS, belonging to the system a signature S is stored which has been generated from information m by means of the key $k_i$ as $S:=Sig(m, k_i)$.

4. A system according to claim 1, wherein a global certificate <TC>, to which a secret key t belongs is stored in the manipulation-protected second storage unit which cannot be accessed from the outside, and
in at least one first storage unit $IDS_i$ belonging to the system, a signature S is stored which has been generated from the information m by means of the key t as $S:=Sig(m, t)$.

5. A system according to claim 2, wherein a global certificate <TC>, to which a secret key t belongs, is stored in the manipulation-protected second storage unit which cannot be accessed from the outside, and
in at least one first storage unit $IDS_i$ belonging to the system, a certificate $<IDS_i>_t$ derived from the global certificate <TC> is stored to which a secret key $k_i$ belongs, and in at least one first storage unit $IDS_i$ belonging to the system, a signature S is stored which has been generated from the information encrypted with $K_i$ by means of the key $k_i$.

6. A system according to claim 2, wherein a global certificate <TC>, to which a secret key t belongs, is stored in the manipulation-protected second storage unit which cannot be accessed from the outside, and
in at least one first storage unit $IDS_i$ belonging to the system, a signature S is stored which has been generated from the information encrypted with $K_i$ by means of the key t.

7. A system according to claim 1, wherein
a cryptographic key K is stored in the manipulation-protected second storage unit which cannot be accessed from the outside, and
a global certificate <TC> to which a secret key t belongs is stored in the manipulation-protected second storage unit which cannot be read out from the outside, and a certificate $<IDS_i>_t$ to which a secret key $k_i$ belongs, and which is derived from the global certificate <TC> is stored in at least one first storage unit $IDS_i$ belonging to the system, and
a unique key $K_i$ is generated with the aid of the key derivation function f from the cryptographic key K for at least one of the first storage units $IDS_i$ belonging to the system: $K_i=f(K, IDS_i)$, and
a signature S is generated from the information m by means of a key $k_i$ as $S:=Sig(m, k_i)$ which is encrypted with the aid of the key Ki and is deposited on at least one of the first storage units $IDS_i$ belonging to the system.

8. A system according to claim 1, wherein a cryptographic key K is stored in the manipulation-protected second storage unit which cannot be accessed from the outside, and a
certificate <TC> to which a secret key t belongs, is stored in the manipulation-protected second storage unit which cannot be accessed from the outside, and
a unique key $K_i$ is generated from the cryptographic key K for at least one of the first storage units $IDS_i$ belonging to the system with the aid of the key derivation function $f:K_i=f(K, IDS_i)$, and
a signature S is generated from the information m by means of the key $k_i$ as $S:=Sig(m, t)$ which is encrypted with the aid of the key Ki and is deposited in at least one of the first storage units $IDS_i$ belonging to the system.

9. A method for the secure processing, handling, and/or transmitting of information with the aid of a system comprising:
a) transmitting information by means of an information transmission unit from a first mobile passive storage unit into a processing device of a system,
wherein said system comprises:
a mobile, passive first storage unit for retrievably storing first information, with an unambiguous identification number $IDS_i$, wherein the index i specifies the number of first storage units belonging to the system;
a processing device which is adapted for interacting with the first storage unit in order to process information, comprising:
i) an unambiguous identification number $IDV_n$, wherein the index n specifies the number of processing devices belonging to the system;
ii) a manipulation-protected second storage unit, which cannot be accessed from the outside, for securely storing second information corresponding to the first information;
iii) a computing unit for processing information, wherein the computing unit is constructed to be integrated in the second storage unit in a manner of a smart card or chip card; and
iv) an information transmission unit for transmitting information from the first and/or the second storage unit to the computing unit and for transmitting information between the processing device and connected peripheral;
wherein at least one of the storage units is constructed as an optical storage unit and at least one of the information transmission units is constructed as an optical information transmission unit in order to transmit information via at least one beam path, and
wherein for a group of at least two processing devices and/or components of the connected peripheral, there is a group certificate <G> with the corresponding secret key g which is stored in the processing device or component belonging to the group, and for each of the processing devices and/or components of the connected peripheral, belonging to the group, there is a certificate $<IDV_n, A_n>_g$ which is signed with the secret key g and is stored in each processing device and/or component belonging to the group, wherein $A_n$ represents attributes which can provide information about characteristics of the processing device and/or component, and
in each of the processing devices and/or component of the connected peripheral belonging to the group, a list of revoked certificates is stored, the list being signed with a global certificate <TC> and this signature also being stored in each processing device and/or component belonging to the group, and wherein the processing device and the peripheral, before exchanging sensitive information, first:
  exchange their certificates $<IDV_n, A_n>_g$, and verify said certificates by application of the group certificate $<G>$, and
  check the validity of other certificates in each case by means of said list of revoked certificates;
b) optionally decrypting the transmitted information if it is encrypted, with the aid of the key K stored in the manipulation-protected second storage unit;
c) optionally deriving a certificate $<IDS_i>_t$ from a global certificate $<TC>$;
d) optionally checking certificate $<IDS_i>_t$ if it exists, with the aid of a certificate $<TC>$ stored in the manipulation-protected second storage unit;
e) optionally checking the signature $S:=Sig(m, k_i)$ if it exists, with the aid of the certificate $<IDS_i>_t$;
f) optionally checking the signature $S:=Sig(m, t)$ if it exists, with the aid of the certificate $<TC>$; and
g) transmitting information from the system to the connected peripheral by means of an information transmission unit.

10. The method for the secure processing or the handling or the transmitting of information with the aid of a system according to claim 9, wherein the transmission of sensitive information between processing device and peripheral occurs encrypted and/or protected.

11. A system according to claim 1 that is an
access control system,
an entrance control system,
an automatic cash dispenser system,
an identification system, and/or a system for administering medical data.

12. A system according to claim 1, wherein the optical storage unit is constructed as a holographic storage unit in the form of a card on which and/or from which the information can be stored and/or retrieved holographically.

13. A system according to claim 1, wherein at least one of the storage units is constructed as a digital storage unit in which and/or from which the information can be digitally stored and/or retrieved.

14. A system according to claim 1, wherein the first mobile storage unit is constructed as an optical storage unit and the second storage unit is constructed as an active storage unit.

15. A system according to claim 1, further comprising a third storage unit for storing third information corresponding to the first and/or second information.

16. A method for securing cryptographic processing, handling, and/or transmission of information with a system, comprising:
a) reading and/or storing first encrypted information on a first passive mobile memory storage unit;
b) reading and/or storing second information corresponding to the first information on a manipulation-protected second storage unit;
c) transmitting the first encrypted information to a computing unit by means of an information transmission unit;
d) transmitting the second information to the computing unit by means of an information transmission unit;
e) cryptographically processing the first information by means of the second information in the computer computing unit; and
wherein steps a-e are performed by a system comprising:
  a mobile, passive first storage unit for retrievably storing first information, with an unambiguous identification number $IDS_i$, wherein the index i specifies the number of first storage units belonging to the system;
  a processing device which is adapted for interacting with the first storage unit in order to process information, comprising:
    i) an unambiguous identification number $IDV_n$, wherein the index n specifies the number of processing devices belonging to the system;
    ii) a manipulation-protected second storage unit, which cannot be accessed from the outside, for securely storing second information corresponding to the first information;
    iii) a computing unit for processing information, wherein the computing unit is constructed to be integrated in the second storage unit in a manner of a smart card or chip card; and
    iv) an information transmission unit for transmitting information from the first and/or the second storage unit to the computing unit and for transmitting information between the processing device and connected peripheral;
  wherein at least one of the storage units is constructed as an optical storage unit and at least one of the information transmission units is constructed as an optical information transmission unit in order to transmit information via at least one beam path
  wherein for a group of at least two processing devices and/or components of the connected peripheral, there is a group certificate $<G>$ with the corresponding secret key g which is stored in the processing device or component belonging to the group, and for each of the processing devices and/or components of the connected peripheral, belonging to the group, there is a certificate $<IDV_n, A_n>_g$ which is signed with the secret key g and is stored in each processing device and/or component belonging to the group, wherein $A_n$ represents attributes which can provide information about characteristics of the processing device and/or component, and
  in each of the processing devices and/or component of the connected peripheral belonging to the group, a list of revoked certificates is stored, the list being signed with a global certificate $<TC>$ and this signature also being stored in each processing device and/or component belonging to the group, and
  wherein the processing device and the peripheral, before exchanging sensitive information, first:
    exchange their certificates $<IDV_n, A_n>_g$, and verify said certificates by the application of the group certificate $<G>$, and
    check the validity of other certificates in each case by means of said list of revoked certificates, and
  wherein the step of reading and/or storing the first encrypted information and/or the step of transmitting the first encrypted information is performed at least partially in a non-electronic manner, and
  wherein the first encrypted information is decrypted with the aid of the computing unit and the second information.

17. A method according to claim 16, wherein reading and/or storing the first encrypted information and/or transmitting the first encrypted information is performed optically, and reading and/or storing the second information and/or transmitting second information is performed electronically.

* * * * *